US012595839B2

(12) United States Patent
Xiong

(10) Patent No.: US 12,595,839 B2
(45) Date of Patent: Apr. 7, 2026

(54) TIMING BELT TENSIONER FOR 3D PRINTER AND 3D PRINTER

(71) Applicant: SHENZHEN TUOZHU TECHNOLOGY CO., LTD., Shenzhen (CN)

(72) Inventor: Rongming Xiong, Shenzhen (CN)

(73) Assignee: SHENZHEN TUOZHU TECHNOLOGY CO., LTD., Shenzhen (CN)

( * ) Notice: Subject to any disclaimer, the term of this patent is extended or adjusted under 35 U.S.C. 154(b) by 104 days.

(21) Appl. No.: 18/460,591

(22) Filed: Sep. 4, 2023

(65) Prior Publication Data

US 2023/0407947 A1 Dec. 21, 2023

Related U.S. Application Data

(63) Continuation of application No. PCT/CN2022/130539, filed on Nov. 8, 2022.

(30) Foreign Application Priority Data

Nov. 10, 2021 (CN) .......................... 202122747360.6

(51) Int. Cl.
*F16H 7/12* (2006.01)
*B29C 64/236* (2017.01)
(Continued)

(52) U.S. Cl.
CPC ............ *F16H 7/1263* (2013.01); *B33Y 30/00* (2014.12); *F16H 37/02* (2013.01); *B29C 64/236* (2017.08);
(Continued)

(58) Field of Classification Search
CPC ................... F16H 7/1263; F16H 37/02; F16H 2007/0808; F16H 2007/081;
(Continued)

(56) References Cited

U.S. PATENT DOCUMENTS 2,785,941 A * 3/1957 Sutherland .............. F16H 19/06
346/139 B
3,908,809 A * 9/1975 Beattie ....................... B41J 7/44
400/157.2
(Continued)

FOREIGN PATENT DOCUMENTS

CN 203098768 U 7/2013
CN 203641417 U 6/2014
(Continued)

OTHER PUBLICATIONS

International Search Report of PCT/CN2022/130539.
(Continued)

*Primary Examiner* — Henry Y Liu
(74) *Attorney, Agent, or Firm* — KILPATRICK TOWNSEND & STOCKTON LLP

(57) ABSTRACT

Various embodiments provide a timing belt tensioner for a 3D printer and the 3D printer. In those embodiments, the timing belt tensioner includes: a mounting frame, an idler and an elastic member, where the idler is connected to the mounting frame, and a timing belt of the 3D printer is wound around the idler, and is configured to drive a movement mechanism of the 3D printer to move on an XY plane; and the elastic member is configured to connect the mounting frame and a base of the 3D printer such that the mounting frame drives the idler to slide to a balance position relative to the base under an elastic force of the elastic member. When at the balance position, a balance is reached between the elastic force of the elastic member and a tensile force of the timing belt acting on the idler.

16 Claims, 14 Drawing Sheets

(51) Int. Cl.
　*B33Y 30/00* 　　(2015.01)
　*F16H 7/08* 　　(2006.01)
　*F16H 37/02* 　　(2006.01)

(52) U.S. Cl.
　CPC ............... *F16H 2007/0808* (2013.01); *F16H 2007/081* (2013.01); *F16H 2007/0842* (2013.01); *F16H 2007/0865* (2013.01); *F16H 2007/0891* (2013.01); *F16H 2007/0895* (2013.01)

(58) Field of Classification Search
　CPC ..... F16H 2007/0842; F16H 2007/0865; F16H 2007/0891; F16H 2007/0895; B33Y 30/00; B29C 64/236; B41J 19/005
　See application file for complete search history.

(56) References Cited

U.S. PATENT DOCUMENTS

| | | | | |
|---|---|---|---|---|
| 4,315,437 | A * | 2/1982 | Etcheparre | B43L 13/046 346/139 B |
| 4,403,877 | A * | 9/1983 | Jones | H02G 11/00 267/221 |
| 4,484,485 | A * | 11/1984 | Matsuhisa | F16H 19/0672 400/322 |
| 4,653,948 | A * | 3/1987 | Ikeda | B41J 19/005 400/331.2 |
| 4,678,354 | A * | 7/1987 | Olsen | B41J 19/005 400/54 |
| 4,746,237 | A * | 5/1988 | Takeda | B41J 19/005 400/322 |
| 5,098,209 | A * | 3/1992 | Gomoll | B41J 19/20 400/335 |
| 5,368,400 | A * | 11/1994 | Cyphert | B44B 5/0061 400/127 |
| 5,415,483 | A * | 5/1995 | Franklin, Jr. | B41J 19/00 403/DIG. 1 |
| 5,595,448 | A * | 1/1997 | Harada | B41J 19/005 400/322 |
| 5,752,811 | A * | 5/1998 | Petro | F04B 9/02 417/362 |
| 5,779,376 | A * | 7/1998 | Seu | B41J 19/005 400/139 |
| 5,816,969 | A * | 10/1998 | Tsai | H04N 1/1013 474/87 |
| 5,964,542 | A * | 10/1999 | Ruhe | B41J 19/005 400/335 |
| 6,004,236 | A * | 12/1999 | Suzuki | F16H 7/0848 474/101 |
| 6,070,480 | A * | 6/2000 | Kerschner | F16H 19/06 74/89.22 |
| 6,076,446 | A * | 6/2000 | Onishi | B26D 1/185 83/578 |
| 6,257,781 | B1 * | 7/2001 | Harris | B41J 19/005 400/285.5 |
| 6,377,364 | B1 * | 4/2002 | Short | F16H 7/1281 358/497 |
| 6,485,207 | B1 * | 11/2002 | Allen | B41J 19/005 400/322 |
| 6,508,534 | B1 * | 1/2003 | Yusef | B41J 19/005 400/335 |
| 6,540,419 | B2 * | 4/2003 | Plumley | B41J 15/04 400/582 |
| 6,598,956 | B2 * | 7/2003 | Yusef | B41J 19/005 400/335 |
| 6,722,872 | B1 * | 4/2004 | Swanson | B29C 64/112 425/375 |
| 6,860,828 | B2 * | 3/2005 | Huang | F16H 7/08 474/101 |
| 7,090,604 | B2 * | 8/2006 | Lin | F16G 1/28 474/109 |
| 7,247,109 | B2 * | 7/2007 | Youn | B41J 19/005 474/109 |
| 7,297,304 | B2 * | 11/2007 | Swanson | B33Y 50/00 264/401 |
| 7,677,718 | B2 * | 3/2010 | Bailey | B41J 19/005 474/117 |
| 7,708,133 | B2 * | 5/2010 | Williams | B41J 19/005 271/84 |
| 9,027,867 | B2 * | 5/2015 | Miyamoto | B65H 23/14 242/419.6 |
| 9,108,360 | B2 * | 8/2015 | Comb | B29C 64/106 |
| 10,122,875 | B2 * | 11/2018 | Miyamoto | H04N 1/00525 |
| 10,300,651 | B2 * | 5/2019 | Noorazar | B29C 48/266 |
| 10,780,628 | B2 * | 9/2020 | Padgett | B29C 64/232 |
| 11,060,590 | B2 * | 7/2021 | Boyum | H04N 1/00525 |
| 11,331,789 | B2 * | 5/2022 | Penn | B25J 9/023 |
| 11,376,791 | B2 * | 7/2022 | Hierro | B29C 64/165 |
| 12,138,787 | B2 * | 11/2024 | Penn | B25J 9/026 |
| 2003/0076380 | A1 * | 4/2003 | Yusef | B41J 19/005 347/37 |
| 2004/0174573 | A1 * | 9/2004 | Hayashi | H04N 1/1017 358/497 |
| 2005/0096165 | A1 * | 5/2005 | Lin | B41J 19/005 474/253 |
| 2005/0147446 | A1 * | 7/2005 | Williams | B41J 19/005 400/323 |
| 2006/0132536 | A1 * | 6/2006 | Bailey | B41J 19/005 347/37 |
| 2006/0181752 | A1 * | 8/2006 | Chang | G03G 15/605 359/196.1 |
| 2006/0240924 | A1 | 10/2006 | Osakabe et al. | |
| 2011/0240788 | A1 * | 10/2011 | Miyamoto | B65H 23/14 242/419.5 |
| 2013/0078073 | A1 * | 3/2013 | Comb | B33Y 40/00 414/800 |
| 2016/0144564 | A1 * | 5/2016 | Padgett | B29C 64/209 425/113 |
| 2016/0193785 | A1 * | 7/2016 | Bell | B29C 64/118 264/255 |
| 2016/0236407 | A1 * | 8/2016 | Armani | B29C 64/118 |
| 2016/0236409 | A1 * | 8/2016 | Armani | B29C 64/106 |
| 2018/0318926 | A1 * | 11/2018 | Woods | B23K 26/0648 |
| 2019/0226559 | A1 * | 7/2019 | Boyum | F16H 7/02 |
| 2019/0299519 | A1 * | 10/2019 | Yeoh | B33Y 30/00 |
| 2020/0061871 | A1 * | 2/2020 | Gerade | B29C 64/245 |
| 2020/0088275 | A1 * | 3/2020 | Dong | F16H 7/1254 |
| 2020/0282659 | A1 * | 9/2020 | Lan | B29C 64/245 |
| 2021/0148440 | A1 * | 5/2021 | Sanchez van den Beuken | B41J 11/007 |
| 2021/0206101 | A1 * | 7/2021 | Hierro | B29C 64/329 |

FOREIGN PATENT DOCUMENTS

| | | |
|---|---|---|
| CN | 206899765 U | 1/2018 |
| CN | 207403181 U | 5/2018 |
| CN | 209682926 U | 11/2019 |
| CN | 210440539 U | 5/2020 |
| CN | 211074713 U | 7/2020 |
| CN | 212764800 U | 3/2021 |
| CN | 213618369 U | 7/2021 |
| CN | 213919597 U | 8/2021 |
| CN | 214111493 U | 9/2021 |
| CN | 216182817 U | 4/2022 |
| CN | 218505233 U | 2/2023 |
| JP | 5107827 A | 4/1993 |
| JP | 2000266146 A | 9/2000 |
| KR | 101631667 B1 | 6/2016 |
| WO | 2020071933 A1 | 4/2020 |

OTHER PUBLICATIONS

Supplementary European Search Report of EP 22891954.4 Dated Sep. 23, 2024.
Patent Right Evaluation Report of the Counterpart CN Patent Application No. 202122747360.6.
Decision on Invalidation of the Counterpart CN Patent Application No. 202122747360.6.

(56)            References Cited

OTHER PUBLICATIONS

Notice of Acceptance of Invalidation Request of the Counterpart
CN Patent Application No. 202122747360.6.
Zhang Tong et al., "3D Printer Easy DIY", published by China
Machinery Industry Press, 2ndedition, 1st printing, Sep. 2017, cover
page, copyright page, pp. 27, 28, 41, 52, 53, 108-119, 198-201,
205-208, 28 pages.

* cited by examiner

700

A 530          420

TIMING BELT TENSIONER FOR 3D PRINTER AND 3D PRINTER

CROSS-REFERENCE TO RELATED APPLICATIONS

This application is a continuation of International Patent Application No. PCT/CN2022/130539, filed on Nov. 8, 2022, which claims priority to Chinese Patent Application No. 202122747360.6, filed on Nov. 10, 2021. The disclosures of the aforementioned applications are hereby incorporated by reference in their entireties.

TECHNICAL FIELD

The present disclosure relates to three-dimensional (3D) printing technology, and in particular to a timing belt tensioner for a 3D printer and the 3D printer.

BACKGROUND 3D printer, also known as three-dimensional printer, is a machine that uses bondable materials such as powdered metals or plastics to construct a 3D object by layer-by-layer printing based on rapid prototyping technology.

In the related art, a 3D printer includes a base, a printing head for ejecting a printing material, and a print table for accommodating the printing material. The print table or the printing head can be connected to the base through a timing belt transmission mechanism, and the movement of the print table or the printing head in an XY plane is achieved through a timing belt. The tension of the timing belt may decrease over time, which further affects the transmission effect. It is thus required to occasionally adjust the timing belt to maintain the timing belt in a tension state.

However, in the related art, the tension of a timing belt can hardly be adjusted to a suitable range.

SUMMARY

It would be advantageous to provide a mechanism that alleviates, mitigates or even eliminates one or more of the above-mentioned problems.

According to an aspect of the present disclosure, a timing belt tensioner for a 3D printer is provided, including: a mounting frame; an idler, where the idler is connected to the mounting frame, and a timing belt of the 3D printer is wound around the idler, and is configured to drive a movement mechanism of the 3D printer to move on an XY plane; and an elastic member, where the elastic member is configured to connect the mounting frame and a base of the 3D printer such that the mounting frame drives the idler to slide to a balance position relative to the base under the action of an elastic force of the elastic member. When at the balance position, a balance is reached between the elastic force of the elastic member and a tensile force of the timing belt acting on the idler.

According to another aspect of the present disclosure, a 3D printer is provided, including: a movement mechanism; a base provided with a timing belt configured to drive the movement mechanism to move on an XY plane; and the above-mentioned timing belt tensioner, where the timing belt is wound around the idler of the timing belt tensioner.

These and other aspects of the present disclosure will become clear on the basis of the embodiments described hereinafter, and will be elucidated with reference to the embodiments described hereinafter.

BRIEF DESCRIPTION OF THE DRAWINGS

Further details, features and advantages of the present disclosure are disclosed in the following description of exemplary embodiments in conjunction with the accompanying drawings. In the accompanying drawings.

DETAILED DESCRIPTION

In the present disclosure, unless otherwise specified, the terms "first", "second", etc., are used for describing various elements and are not intended to define a positional relationship, a temporal relationship or an importance relationship of these elements, and such terms are used only for distinguishing one element from another. In some examples, a first element and a second element may refer to the same instance of the element, while in some cases they may refer to different instances based on the context of the description.

The terms used in the description of the various described examples in the present disclosure are for the purpose of describing particular examples only and are not intended to be limiting. Unless otherwise clearly indicated in the context, if the number of elements is not specifically limited, there may be one or a plurality of elements. As used herein, the term "plurality" means two or more, and the term "based on" should be construed as "based, at least in part, on". Furthermore, the terms "and/or" and "at least one of" encompass any of and all possible combinations of the listed items.

In the related art, a 3D printer includes a base, a printing head for ejecting a printing material, and a print table for accommodating the printing material. The print table and the printing head are regarded as moving members of the 3D printer, and both can move relative to the base. For example, the print table can move along a Z axis (vertical direction), while the printing head can move in an XY plane (horizontal plane). Taking the movement of the printing head in the XY plane as an example, the printing head may be connected to the base through a timing belt transmission mechanism, and the timing belt is engaged with a pulley to enable the printing head to move in the XY plane.

However, the tension of the timing belt may decrease over time, which further affects the transmission effect. It is thus required to occasionally adjust the timing belt to maintain the timing belt in a tension state. In the related art, an operator is usually required to manually adjust the tension degree of the timing belt and repeatedly measure a tensile force until the tensile force is within a suitable predetermined range.

However, this process is time consuming since repeated adjustment and measurement is required; in addition, it is hard to adjust the tensile force of the timing belt to a suitable range, which lowers the printing precision of the 3D printer.

In order to solve at least one of the above-mentioned problems, the embodiment of the present disclosure provides a timing belt tensioner for a 3D printer and the 3D printer. Through the arrangement of a mounting frame, an idler connected to the mounting frame, and an elastic member connected between a base and the mounting fame, the timing belt can be automatically adjusted to a suitable tension state.

Figure 1:
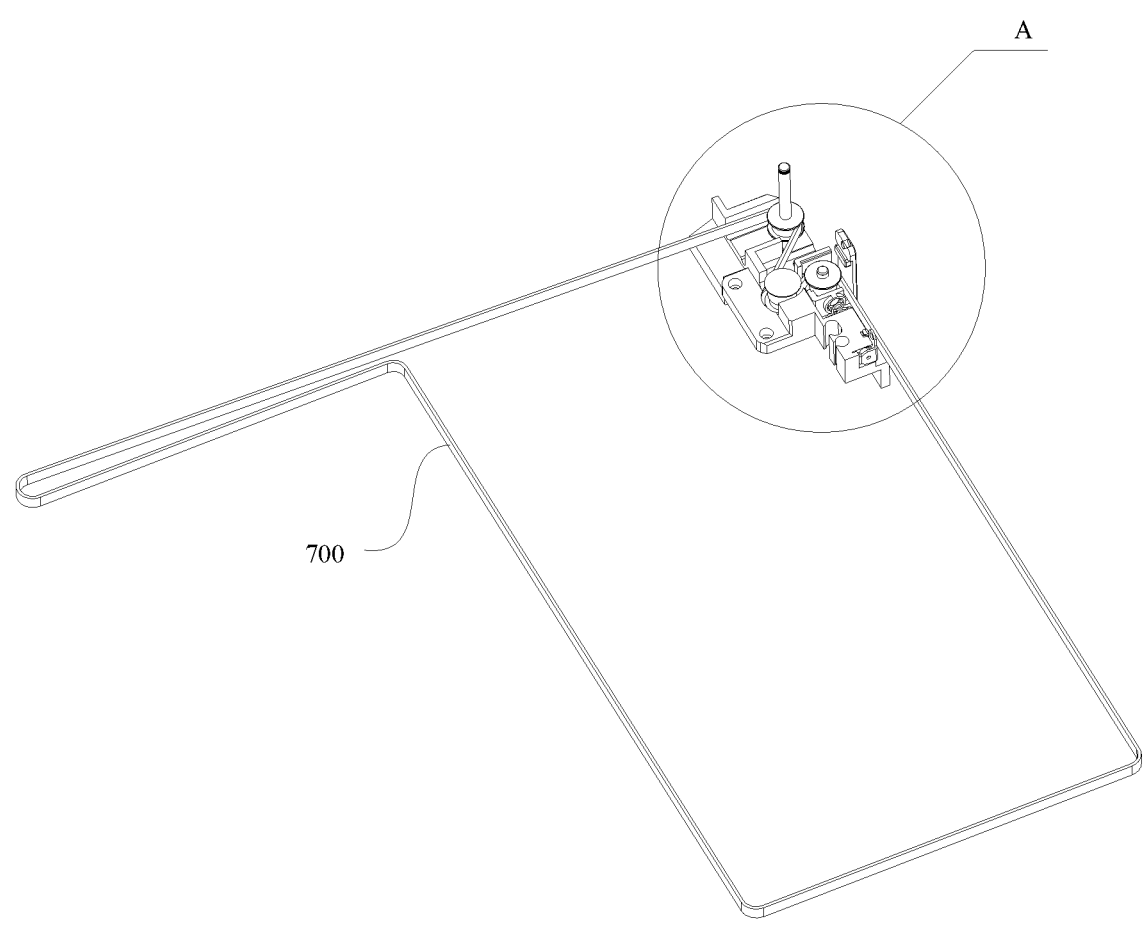
FIG. 1 shows a schematic structural diagram of a timing belt tensioner for a 3D printer according to some embodiments of the present disclosure.
Figure 2:
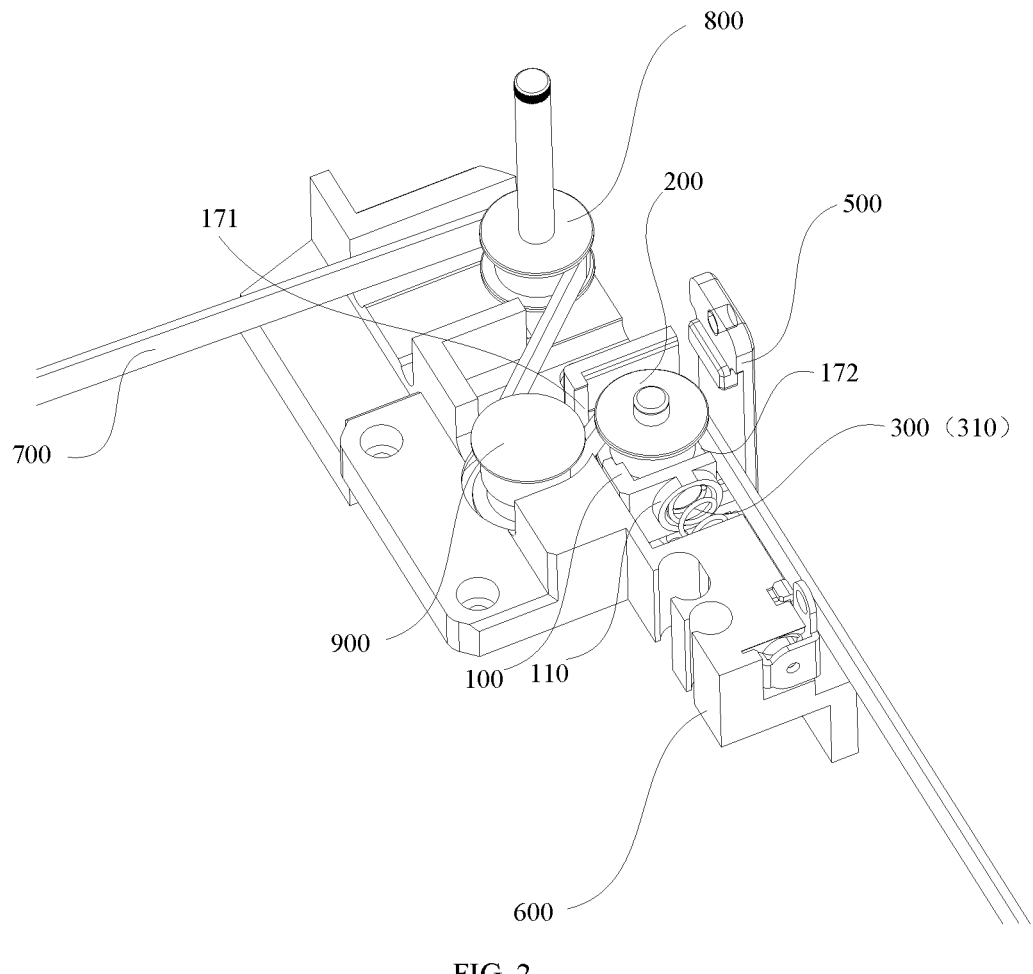
FIG. 2 is a partial enlarged view of a position A of FIG. 1.
Figure 3:
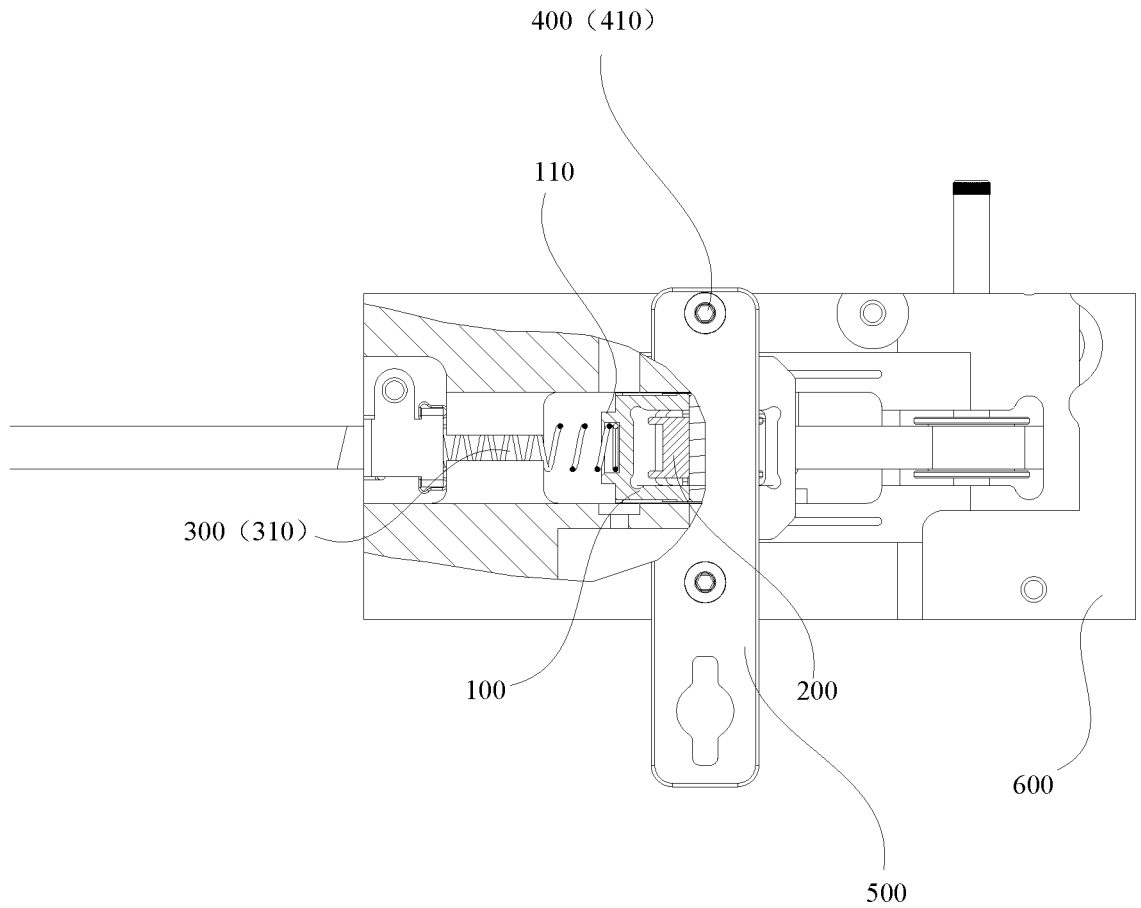
FIG. 3 is a partial sectional view taken from an angle of a position of an idler in FIG. 2.
Figure 4:
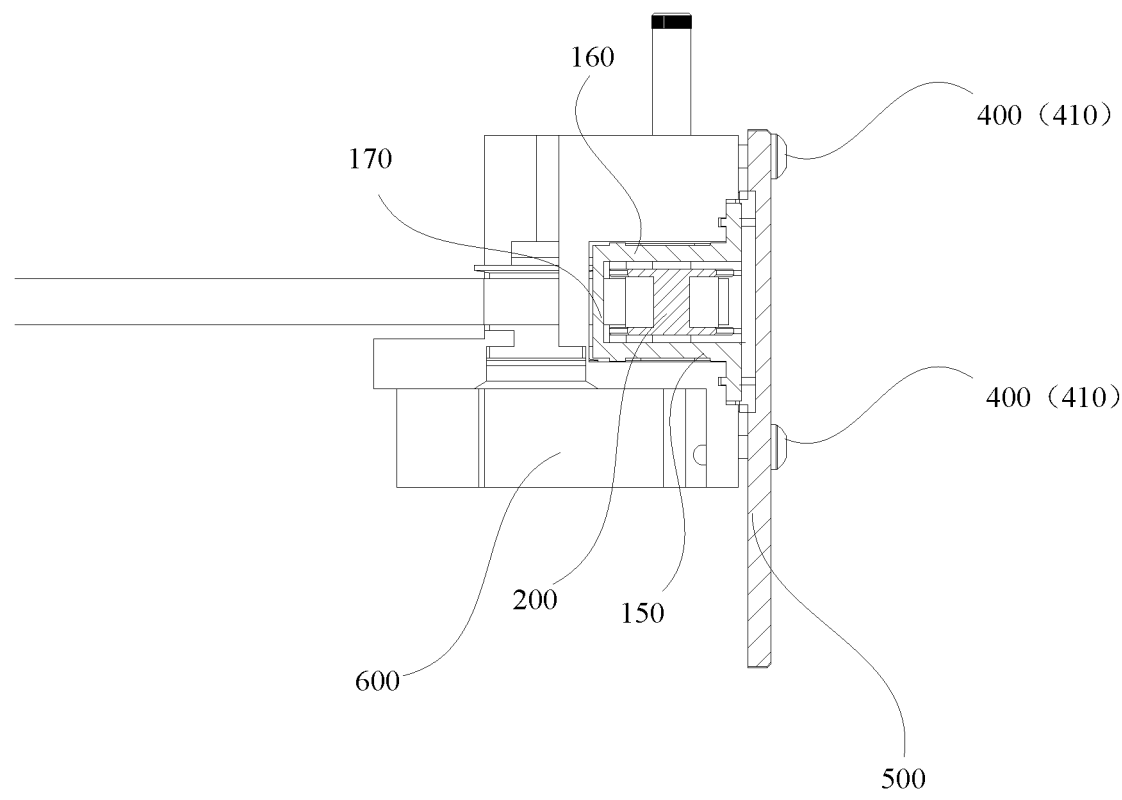
FIG. 4 is a partial sectional view taken from another angle of the position of the idler in FIG. 2.
Figure 5:
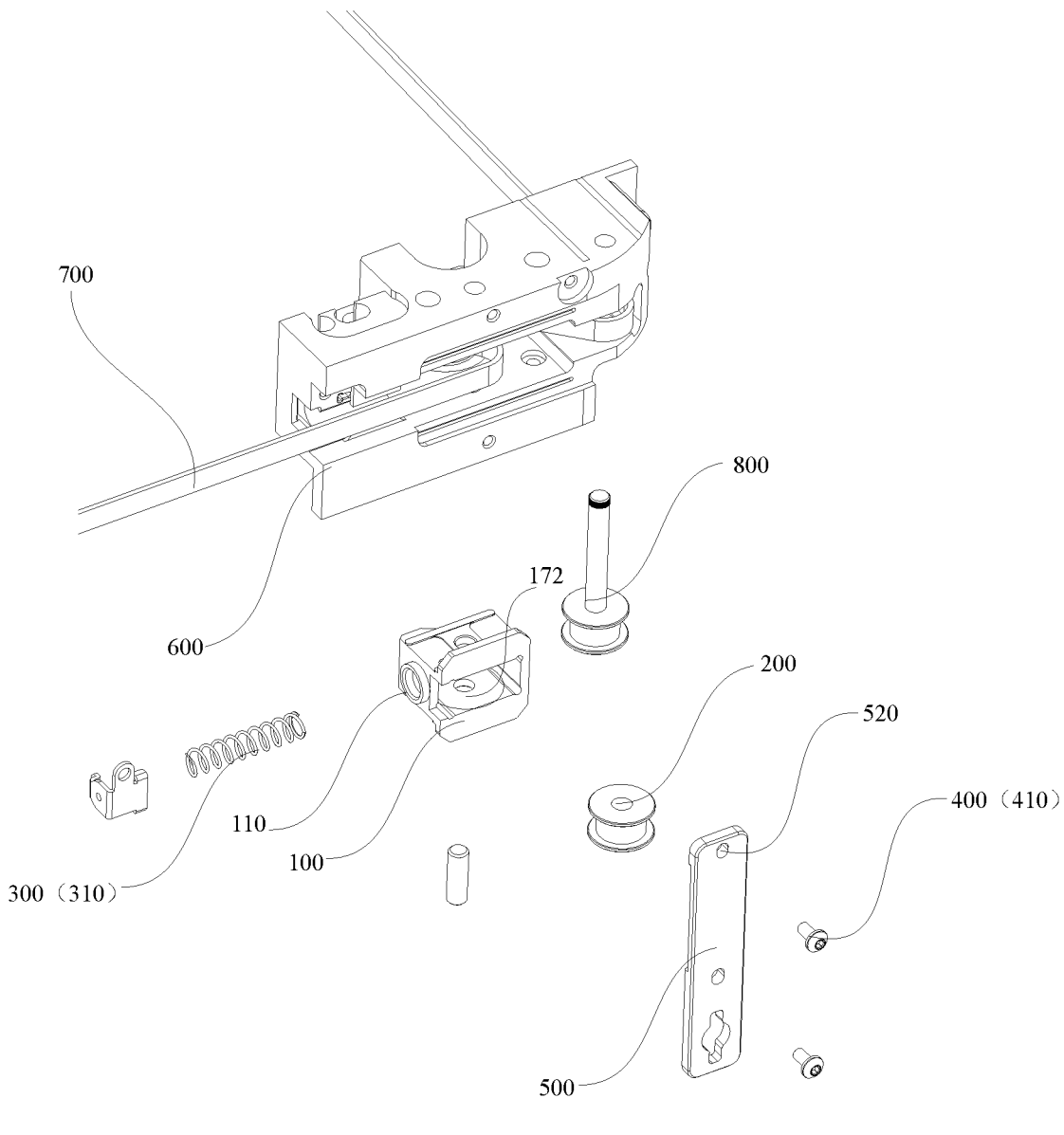
FIG. 5 is an exploded view of FIG. 2.
Figure 6:
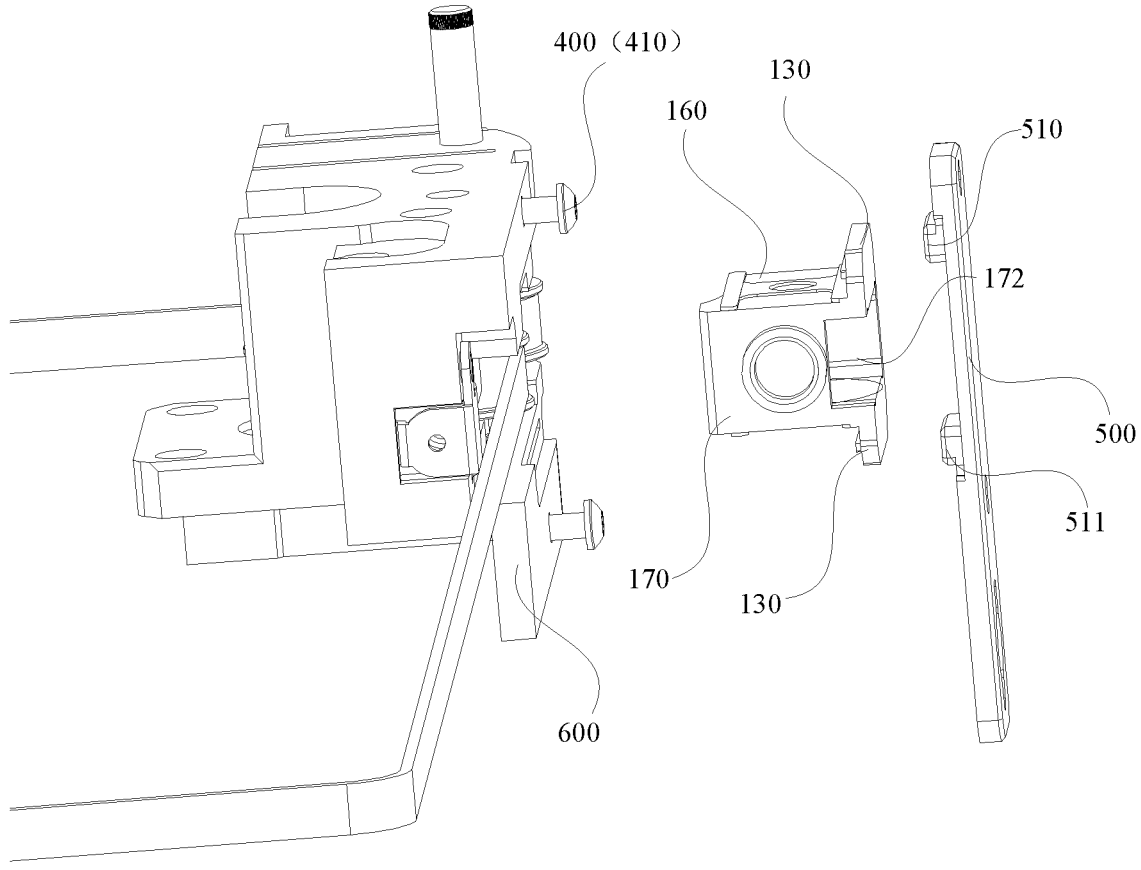
FIG. 6 is another exploded view of FIG. 2.

The embodiments of the present disclosure are described in detail below with reference to the accompanying drawings. FIG. 1 shows a schematic structural diagram of a timing belt tensioner for a 3D printer according to some embodiments of the present disclosure. FIG. 2 is a partial enlarged view of a position A of FIG. 1. FIG. 3 is a partial sectional view taken from an angle of a position of an idler in FIG. 2. FIG. 4 is a partial sectional view taken from another angle of the position of the idler in FIG. 2. FIG. 5 is an exploded view of FIG. 2. FIG. 6 is another exploded view of FIG. 2.

Referring to FIG. 1 to FIG. 6, an embodiment of the present disclosure provides a timing belt tensioner for a 3D printer, where the timing belt tensioner may be used for a 3D printer, and the 3D printer includes a base 600 and a movement mechanism. The movement mechanism includes at least one of a printing head for ejecting a printing material, a print table for accommodating the printing material, or the like. The print table and the printing head are regarded as movement mechanisms of the 3D printer, and both can move relative to the base. For example, the print table can move along a Z axis (vertical direction), and the printing head can move in an XY plane (horizontal plane). Certainly, in other embodiments, the print table may also move in the XY plane, and the printing head may move along the Z axis. Movement of both the printing head and the print table in the XY plane may be achieved by a belt transmission mechanism. The belt transmission mechanism includes a plurality of pulleys 800 and a timing belt 700 wound around the pulleys 800.

It may be understood that, the timing belt tensioner according to the embodiments of the present disclosure is adjusted aiming at a timing belt of a belt transmission mechanism for driving a moving member to move in an XY plane. The timing belt tensioner includes: a mounting frame 100, an idler 200, and an elastic member 300.

The mounting frame 100 may be of a box-like structure or a frame-like structure, and may be made of common materials such as metal or plastic.

The idler 200 may be of a wheel-shaped structure pivotally connected to the mounting frame 100, and the idler 200 is configured to be wound with a timing belt 700 of the 3D printer, and an axis of the idler 200 may extend along the Z axis, such that the timing belt 700 is configured to drive a movement mechanism of the 3D printer to move on the XY plane. As used herein, the term "idler" refers to a pulley on a shaft that abuts against or presses against a timing belt to guide the timing belt and tighten a loose portion.

It may be understood that, the idler 200 can rotate about the axis of the idler 200 relative to the mounting frame 100, for example, the idler 200 can be connected to the mounting frame 100 via a rotating shaft, where the rotating shaft can be fixed on the mounting frame 100, and the idler 200 can be sleeved outside the rotating shaft and rotate relative thereto. The idler 200 may be disposed between two pulleys 800 of the belt transmission mechanism, and an idler surface of the idler may be configured to connect the timing belt 700 such that part of the timing belt 700 may be wound around a portion of the idler surface of the idler 200. As shown in FIG. 2, in some embodiments, a connecting wheel 900 may be further disposed between the idler 200 and the pulley 800, and the connecting wheel 900 may play a role of increasing a wrap angle of the timing belt, so as to improve movement smoothness.

The elastic member 300 is configured to connect the mounting frame 100 and the base 600 of the 3D printer, and the mounting frame 100 can slide to a preset position relative to the base 600 under the action of an elastic force of the elastic member 300.

The elastic member 300 may be a spring, an elastic block, or other structures having an elastic force. The elastic member 300 may be connected between the mounting frame 100 and the base 600. The preset position may be a position where the mounting frame 100 can remain stationary relative to the base 600, i.e., a position with a balanced force where the mounting frame 100 can be automatically moved to relative to the base 600 under the action of the elastic force of the elastic member 300. It may be understood that, when at the preset position, a tensile force of the timing belt 700 acting on the idler 200 and the elastic force of the elastic member 300 may be kept balanced (e.g., the two counteract each other), such that the timing belt 700 is in a suitable tension state, i.e., the timing belt is neither over-tensioned nor over-relaxed. Therefore, the preset position may also be referred to as a balance position. It should be understood that, the preset position mentioned herein is not a predetermined position, but a pre-existing position.

Through the arrangement of the elastic member 300, it can be ensured that, within the deformation adjustment range of the elastic member 300, the tensile force of the timing belt 700 is always changed within a predetermined range. Therefore, when the mounting frame 100 is moved to the balance position, the tensile force of the timing belt 700 is also within the predetermined range, and thus the timing belt 700 is in a suitable tension state without the need for additional measurement.

In some embodiments, the timing belt tensioner further includes a fastening assembly 400. The fastening assembly 400 is configured to be connected between the mounting frame 100 and the base 600, so as to fasten the mounting frame 100 to a balance position. The fastening assembly 400 may be a screw, nut, or other structures capable of achieving fastening. It may be understood that, the fastening assembly 400 may be configured to fasten the mounting frame 100 to the base 600 after the mounting frame 100 automatically slides to the balance position.

When the 3D printer detects that the tensile force of the timing belt exceeds an expected range, a user can be prompted to conduct timing belt tensioning. The user may loosen the fastening assembly 400 such that the mounting frame 100 and the base 600 may move relative to each other. The mounting frame 100 may slide to the balance position relative to the base 600 under the action of the elastic force of the elastic member 300. When at this position, the tensile force of the timing belt 700 acting on the mounting frame 100 through the idler 200 and the elastic force of the elastic member 300 may be kept balanced, such that the mounting frame 100 stops sliding. The timing belt 700 is in a suitable tension state, i.e., the timing belt is not over-tensioned or over-relaxed, and under the tension state, the tensile force of the timing belt also meets a predetermined range. The mounting frame 100 may then be fastened to this balance position by the fastening assembly 400. Compared with manual adjustment on a tensile force of a timing belt, the present disclosure makes it easier to adjust the tensile force of the timing belt to a predetermined range with simpler operation, which thus guarantees the printing precision of the 3D printer.

As an embodiment of the mounting frame 100, the mounting frame 100 has a bottom wall 150, a top wall 160, and a side wall 170 connecting the bottom wall 150 and the top wall 160. The idler 200 is pivotally connected between the bottom wall 150 and the top wall 160. For example, two ends of a rotating shaft of the idler 200 may be connected to the top wall 160 and the bottom wall 150, respectively, and the side wall 170 is provided with a first aperture 171 and a second aperture 172 for the timing belt 700 to penetrate in and out, respectively. The first aperture 171 and the second aperture 172 may be disposed opposite to each other, and the widths of the first aperture 171 and the second aperture 172 may be large enough to allow the adjustment of the position of the timing belt 700, thereby adjusting the tensile force of the timing belt. In addition, the elastic member 300 may be connected to the side wall 170. With such configuration, the idler 200 can be mounted in the mounting frame 100, and the first aperture 171 and the second aperture 172 are configured to separate the timing belt 700 from the mounting frame 100, thereby preventing interference with the transmission of the timing belt 700.

In some embodiments, as a possible implementation of the elastic member 300, the elastic member 300 includes a coil spring 310, where a first end of the coil spring 310 abuts against the mounting frame 100, and a second end of the coil spring 310 abuts against the base 600. The coil spring 310 may be in a compressed state, and when the tensile force of the timing belt is insufficient, the mounting frame 100 may be pushed to move by the coil spring 310, such that the timing belt 700 is in a tension state again. The coil spring 310 is simple in structure and low in cost.

Referring to FIG. 2 and FIG. 3, the mounting frame 100 is provided with an annular protrusion 110. In an example, the annular protrusion 110 may be disposed on the side wall 170. The first end of the coil spring 310 can be disposed in a space defined by the annular protrusion 110, and the annular protrusion 110 can play a limiting role on the coil spring 310 to prevent the coil spring 310 from shaking back and forth. In some embodiments, the first end of the coil spring 310 may also be sleeved outside the annular protrusion 110. In general, a first end of the coil spring 310 is disposed at a position defined by the annular protrusion 110. The coil spring 310 may be fixedly connected to the mounting frame 100.

In some embodiments, the mounting frame 100 may also be provided with an annular recess, and the first end of the coil spring 310 may be disposed in a space defined by the annular recess. Thus, the annular recess plays a limiting role on the coil spring 310 to prevent the coil spring 310 from shaking back and forth. The first end of the coil spring 310 may abut against the bottom wall of the annular recess and be connected thereto by gluing or the like, and/or the first end of the coil spring 310 may be connected to the side wall of the annular recess.

In some embodiments, the timing belt tensioner further includes: a pressing block 500, the pressing block 500 having a pressing portion 510 configured to contact the mounting frame 100 to press the mounting frame 100 against the base 600. The fastening assembly 400 is configured to fasten the pressing block 500 onto the base 600.

It may be understood that, the pressing block 500 may be of a plate-like structure, or block-like structure. The pressing block may have a pressing portion 510 capable of contacting the mounting frame 100, and the pressing portion 510 may be part of surface of the pressing block 500. The fastening assembly 400 may be configured to fasten the pressing block 500 onto the base 600 to connect the mounting frame 100 and the base 600 by the pressing block 500, and to press and fasten the mounting frame 100 onto the base 600 by the acting force between the pressing block 500 and the base 600.

In some embodiments, as shown in FIG. 6, the pressing portion 510 includes two protrusions 511 disposed on the pressing block 500, the mounting frame 100 has two lug portions 130 spaced apart along the axis of the idler 200, and each protrusion 511 is configured to be pressed against one of the lug portions 130. In some embodiments, two lug portions 130 may also be spaced apart in the sliding direction of the mounting frame 100 (i.e., the direction of the elastic force of the elastic member), as long as both lug portions abut against the base 600.

Still referring to FIG. 5 and FIG. 6, the base 600 is provided with a mounting groove accommodating the elastic member 300 and the mounting frame 100. Two lug portions 130 of the mounting frame 100 protrude from the mounting groove such that the two lug portions 130 on the mounting frame 100 can easily abut against the two lug portions 130. As illustrated, two lug portions 130 are located between the two lug portions 130 and the side wall of the base 600, respectively.

The protrusion 511 may be in a circular shape, a square shape, and the like. Two lug portions 130 can be disposed on two sides of the second aperture 172 and can protrude from the top wall 160 and the bottom wall 150, respectively. Each protrusion 511 can be configured to abut against one of the lug portions 130, and the mounting frame 100 is fastened to the base 600 under the action of the fastening assembly 400.

As a possible implementation of the fastening assembly 400, the fastening assembly 400 includes a plurality of first fasteners 410, and the first fastener 410 may be a screw, a bolt, or other fastener structures. The pressing block 500 is provided with a plurality of first mounting holes 520, and each first fastener 410 penetrates through one of the first mounting holes 520 and is in threaded connection with the base 600. Some first mounting holes 520 of the plurality of first mounting holes 520 are located on one end of the idler 200 along the axis of the idler 200, and the other first mounting holes 520 of the plurality of first mounting holes 520 are located on the other end of the idler 200 along the axis of the idler 200.

It may be understood that, there may be a plurality of first fasteners 410, such as 2, 4 and 6 first fasteners. These first fasteners 410 may be separately located on two ends of the idler 200 along the axis of the idler, such that the mounting frame 100 may be more securely connected to the base 600.

Still referring to FIG. 5 and FIG. 6, in some embodiments, the pressing block 500 extends in a direction parallel to the axis of the idler 200, a total of 2 first fasteners 410 are disposed in the fastening assembly 400, and the two first fasteners 410 are located on two ends of the idler 200, respectively. The pressing block 500 is provided with two first mounting holes 520, and each of the first mounting holes 520 can be connected with one first fastener 410. In addition, two protrusions 511 may also be disposed between the two first mounting holes 520, such that the whole pressing block 500 can cover the whole mounting frame 100 in the direction parallel to the axis of the idler 200, and a better pressing effect is achieved.

When it is required to adjust the tensile force of the timing belt 700, a plurality of first fasteners 410 may be loosened such that the pressing portion 510 is separated from the mounting frame 100, and at this time, the mounting frame 100 may be moved to the balance position under the action of the elastic force of the elastic member 300. The plurality of first fasteners 410 may then be tightened such that the pressing portion 510 may press the mounting frame 100 against the base 600, and the mounting frame 100 may remain stationary relative to the base 600.

Figure 7:
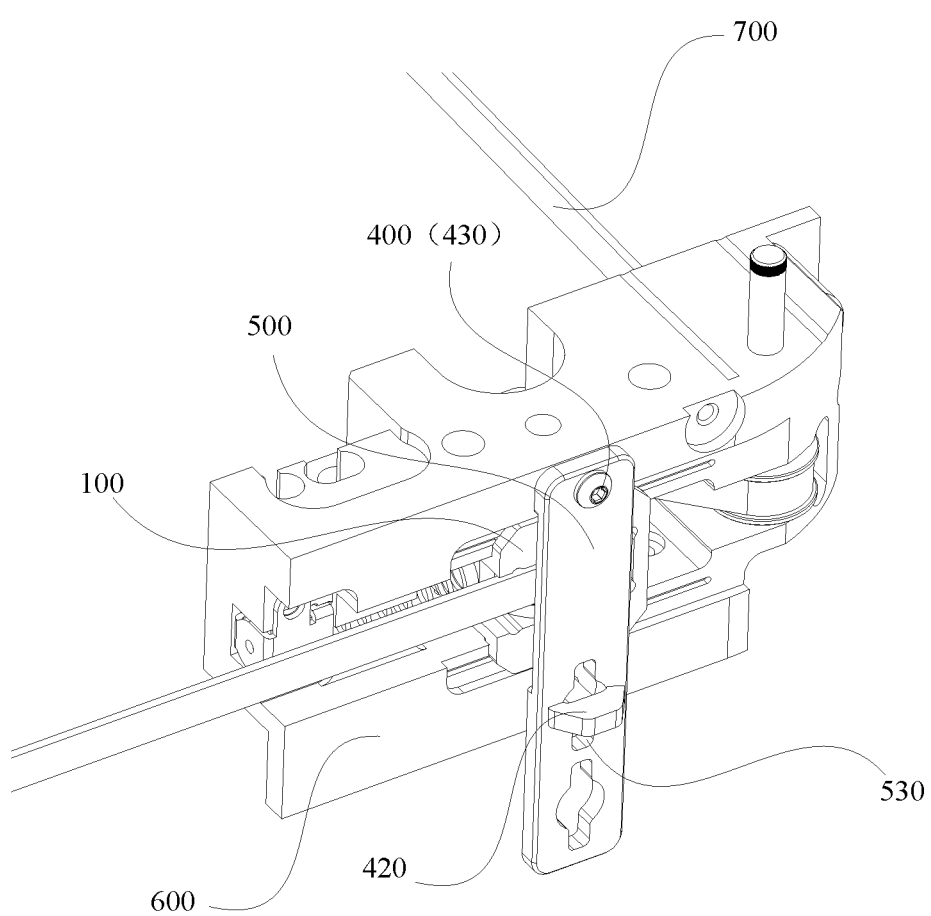
FIG. 7 is another schematic structural diagram of a fastening assembly in FIG. 2.
Figure 8:
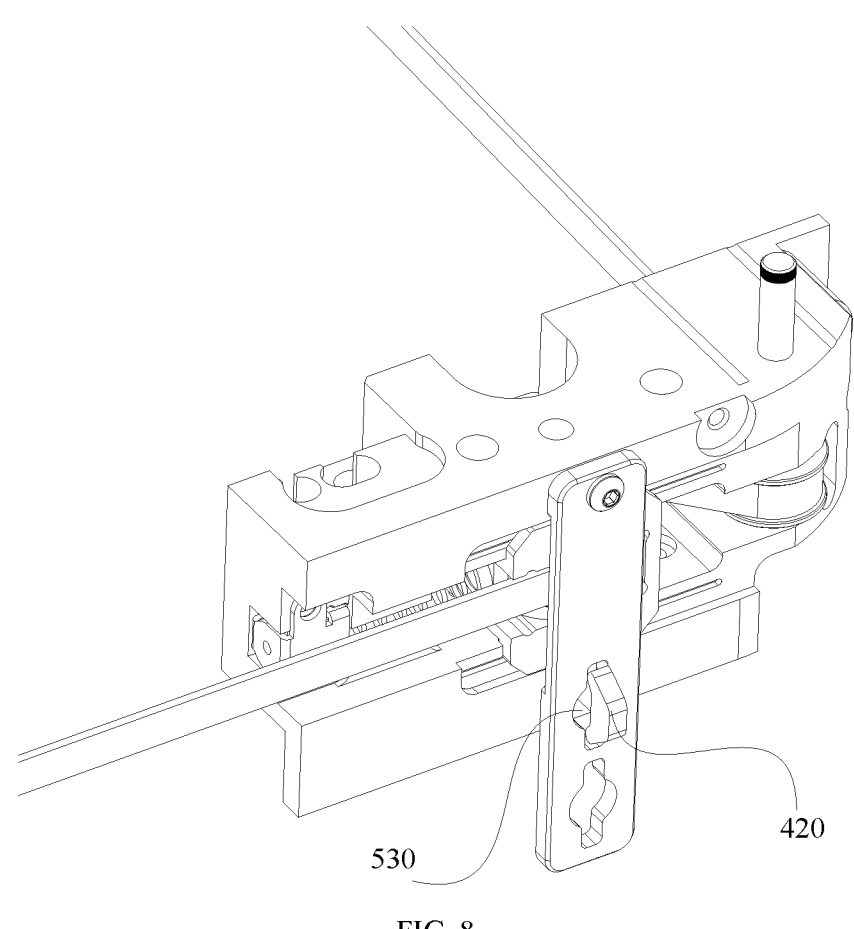
FIG. 8 is a schematic view illustrating a state in which a rotary block of FIG. 7 is rotated to penetrate through a through hole.

In some embodiments, the fastening assembly 400 can be implemented in other ways than being configured to include a plurality of first fasteners 410. FIG. 7 is another schematic structural diagram of a fastening assembly in FIG. 2. FIG. 8 is a schematic view illustrating a state in which a rotary block of FIG. 7 is rotated to penetrate through a through hole. Referring to FIG. 7 and FIG. 8, the fastening assembly 400 includes: a rotary block 420 and a second fastener 430.

The rotary block 420 is rotatably connected to the base 600, and may be of a block-like structure, and the rotary block 420 may have a first length direction and a first width direction, where a dimension of the rotary block in the first length direction may be greater than a dimension of the rotary block in the first width direction. Besides, the first length direction and the first width direction are both perpendicular to an axis of rotation of the rotary block 420.

The pressing block 500 is provided with a through hole 530 matching the rotary block 420 in shape, i.e., the through hole 530 may also have a second length direction and a second width direction, and the dimension of the through hole in the second length direction is also greater than the dimension of the through hole in the second width direction.

When the rotary block 420 rotates by a preset angle relative to the through hole 530, the rotary block 420 can penetrate through the through hole 530. The preset angle may be an angle formed when the first length direction of the rotary block 420 is parallel to the second length direction of the through hole 530 and the first width direction is parallel to the second width direction. On the contrary, if the rotary block does not rotate by the preset angle, the rotary block 420 interferes with the through hole 530, and at this time, the rotary block 420 cannot penetrate through the through hole 530.

The second fastener 430 may also be of a fastening structure such as a screw or a bolt. The pressing block 500 is further provided with a second mounting hole, and the second fastener 430 penetrates through the second mounting hole and is in threaded connection with the base 600.

It may be understood that, when it is required to adjust the tensile force of the timing belt 700, the second fastener 430 may be unscrewed and then the rotary block 420 may be rotated by a preset angle. The pressing block 500 may then be removed from the base 600, and at this time, the mounting frame 100 may be moved to the balance position under the action of the elastic force of the elastic member 300. The pressing block 500 is then brought close to the base 600 such that the rotary block 420 can penetrate through the through hole 530 of the pressing block 500. The second fastener 430 then penetrates through the second mounting hole and is tightened onto the base 600.

Figure 9:
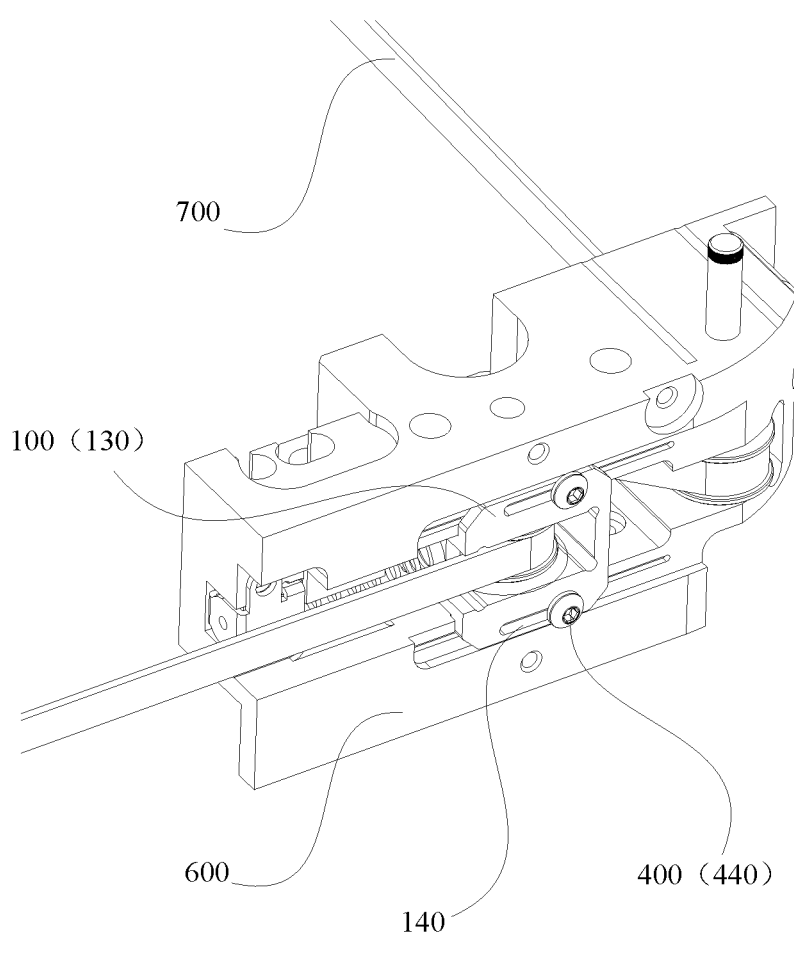
FIG. 9 is yet another schematic structural diagram of the fastening assembly in FIG. 2.

FIG. 9 is yet another schematic structural diagram of the fastening assembly in FIG. 2. Referring to FIG. 9, in other embodiments, the fastening assembly 400 may further include at least one third fastener 440, the mounting frame 100 is provided with at least one elongated hole 140, each elongated hole 140 extends in a direction parallel to a sliding direction of the mounting frame 100, and each third fastener 440 penetrates through one elongated hole 140 and is in threaded connection with the base 600.

The third fastener 440 may be a fastening structure such as a screw or a bolt. There may be 1, 2, 4 or 6 third fasteners 440, and the elongated hole 140 may be in a plurality of shapes such as an oblong and a rectangle.

In FIG. 9, two third fasteners 440 are disposed, the mounting frame 100 is provided with two elongated holes 140, and the two elongated holes 140 may be disposed on the two lug portions 130 of the mounting frame 100, respectively. Each of the third fasteners 440 may penetrate through one of the elongated holes 140 and is in threaded connection with the base 600.

Figure 10:
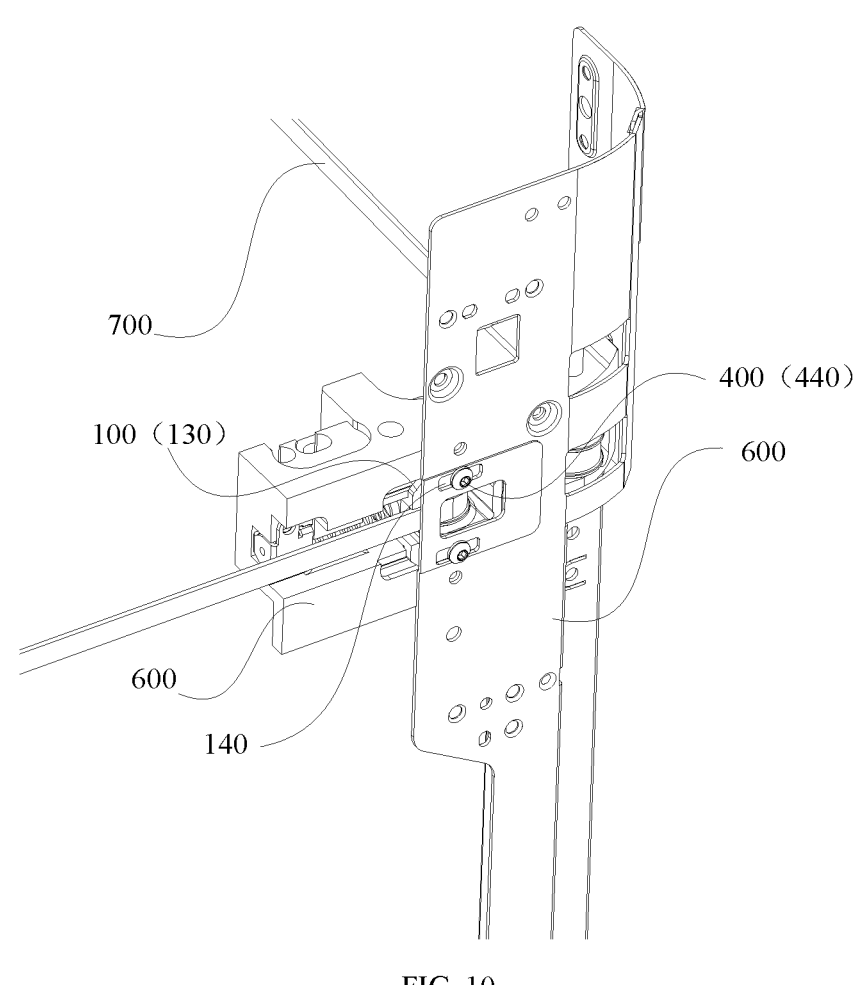
FIG. 10 is still another schematic structural diagram of the fastening assembly in FIG. 2.

Certainly, the elongated hole 140 may also be disposed on the base 600. FIG. 10 is still another schematic structural diagram of the fastening assembly in FIG. 2. Referring to FIG. 10, the base 600 is provided with at least one elongated hole 140, each elongated hole 140 extends in a direction parallel to the sliding direction of the mounting frame 100, and each third fastener 440 penetrates through one elongated hole 140 and is in threaded connection with the mounting frame 100.

In FIG. 10, two third fasteners 440 are disposed, the base 600 is provided with two elongated holes 140, and each third fastener 440 can penetrate through one of the elongated holes 140 and is in threaded connection with the mounting frame 100.

It may be understood that, the base 600 does not refer to only one part, but is a general term of reference objects for movement of the mounting frame 100. The base 600 may include a plurality of portions or a plurality of parts. For example, two positions designated by reference numeral 600 in FIG. 10 can be kept relatively fixed, and both can refer to the base 600.

In the above various embodiments of the third fastener, the third fastener 440 and the elongated hole 140 can both be disposed to fasten the mounting frame 100 to the base 600, and the elongated hole 140 may allow the mounting frame 100 to be fastened to different positions of the base 600, such that the tensile force of the timing belt 700 can be conveniently adjusted, and the structure is simple and easy to implement.

In FIG. 9 and FIG. 10, the fastening assembly 400 includes two third fasteners 440, and the two third fasteners 440 are located on two ends of the idler 200 along the axis of the idler 200, respectively. That is, the two third fasteners 440 are located on two ends of the mounting frame 100, respectively, and the two ends of the mounting frame 100 are opposite to each other in a direction perpendicular to a sliding direction of the mounting frame 100 relative to the base 600. In this way, the mounting frame 100 can be securely connected to the base 600.

In some embodiments, the mounting frame 100 is further provided with a sliding block, and the base 600 may be provided with a sliding rail, such that when the mounting frame 100 slides relative to the base 600, the sliding block can slide in the sliding rail, thereby playing a guiding role.

In an example, a sliding block may be disposed on a lug portion 130 of the mounting frame 100, i.e., each lug portion 130 may be provided with one sliding block, such that the movement of the mounting frame 100 is smooth and steady.

Figure 11:
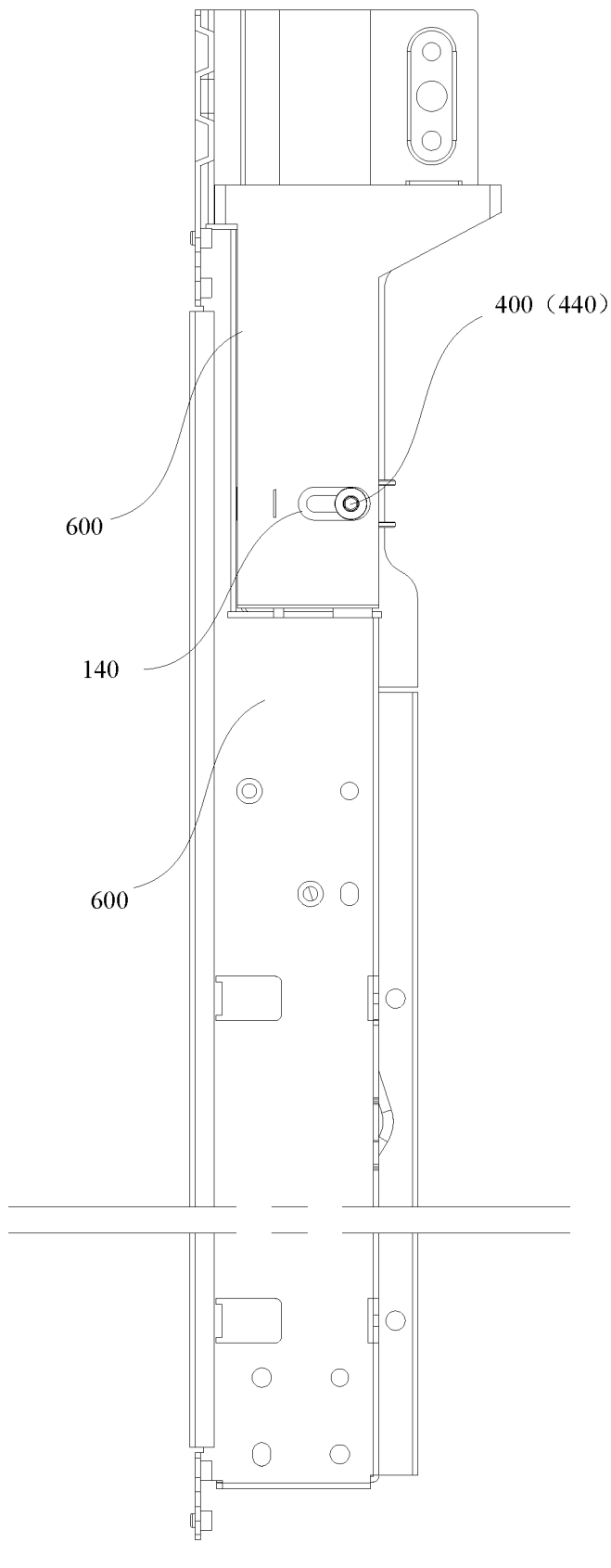
FIG. 11 is a schematic structural diagram of a timing belt tensioner for a 3D printer according to some embodiments of the present disclosure.
Figure 12:
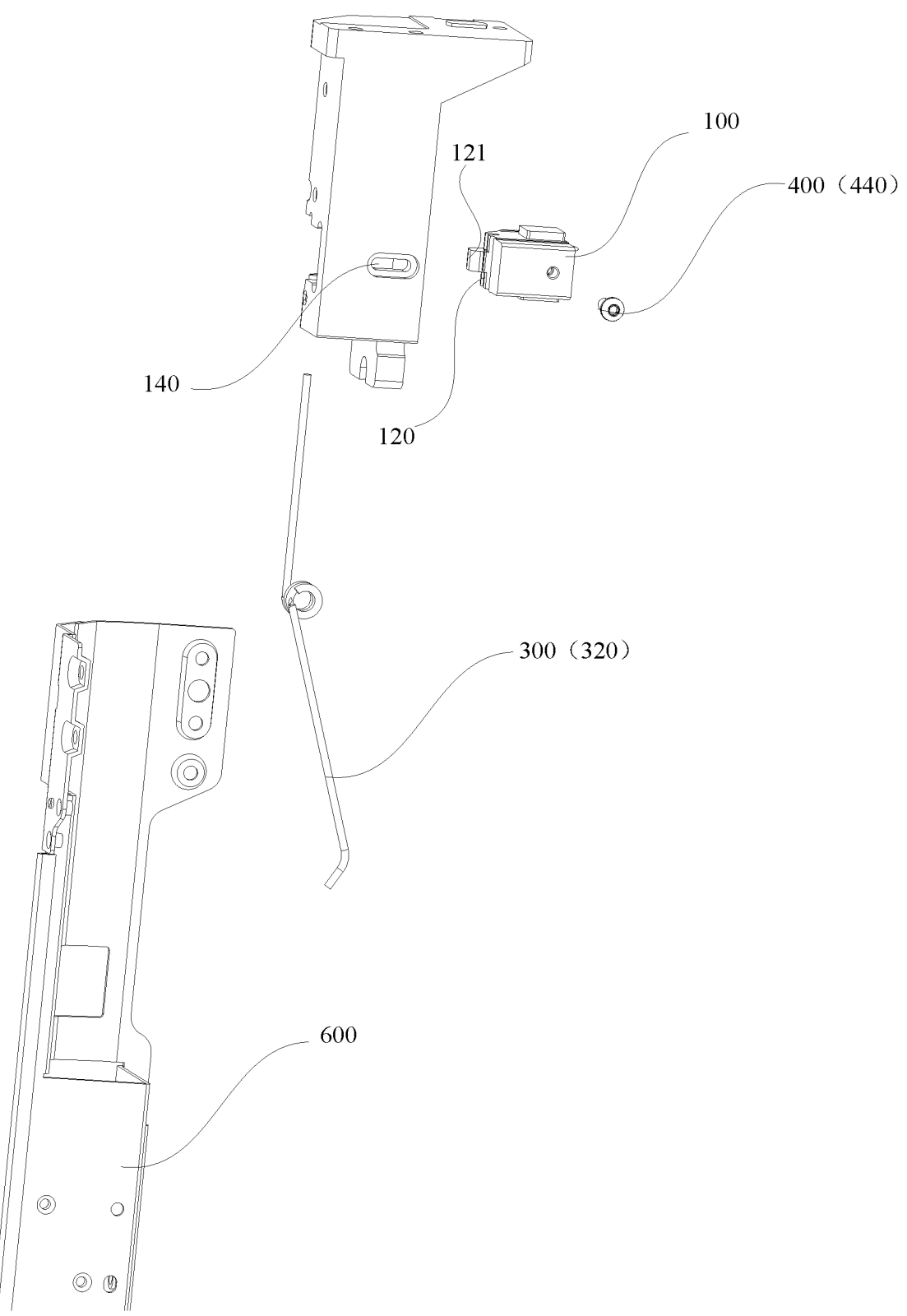
FIG. 12 is an exploded view of FIG. 11.
Figure 13:
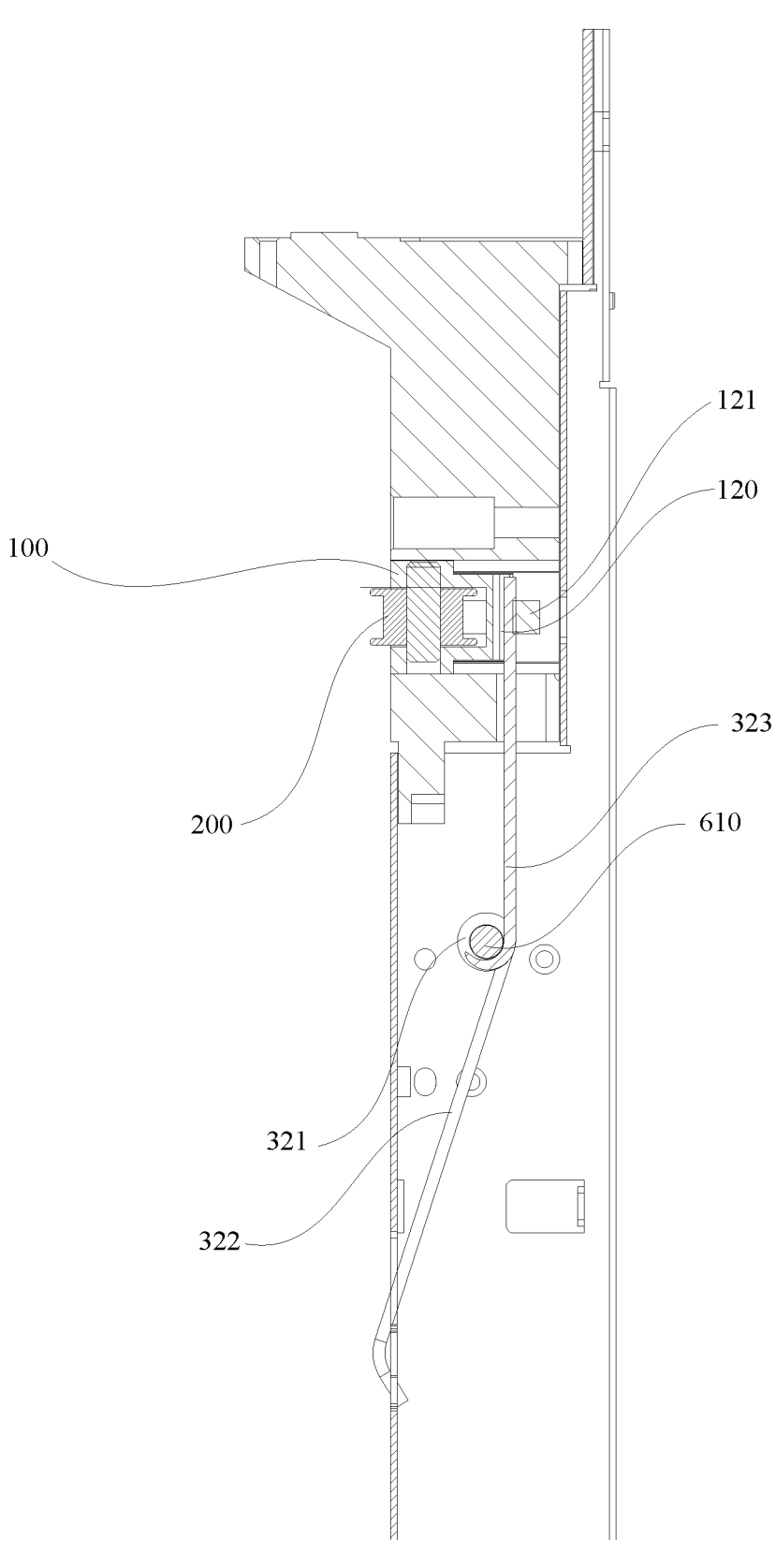
FIG. 13 is a partial sectional view taken at a position of an idler in FIG. 11.
Figure 14:
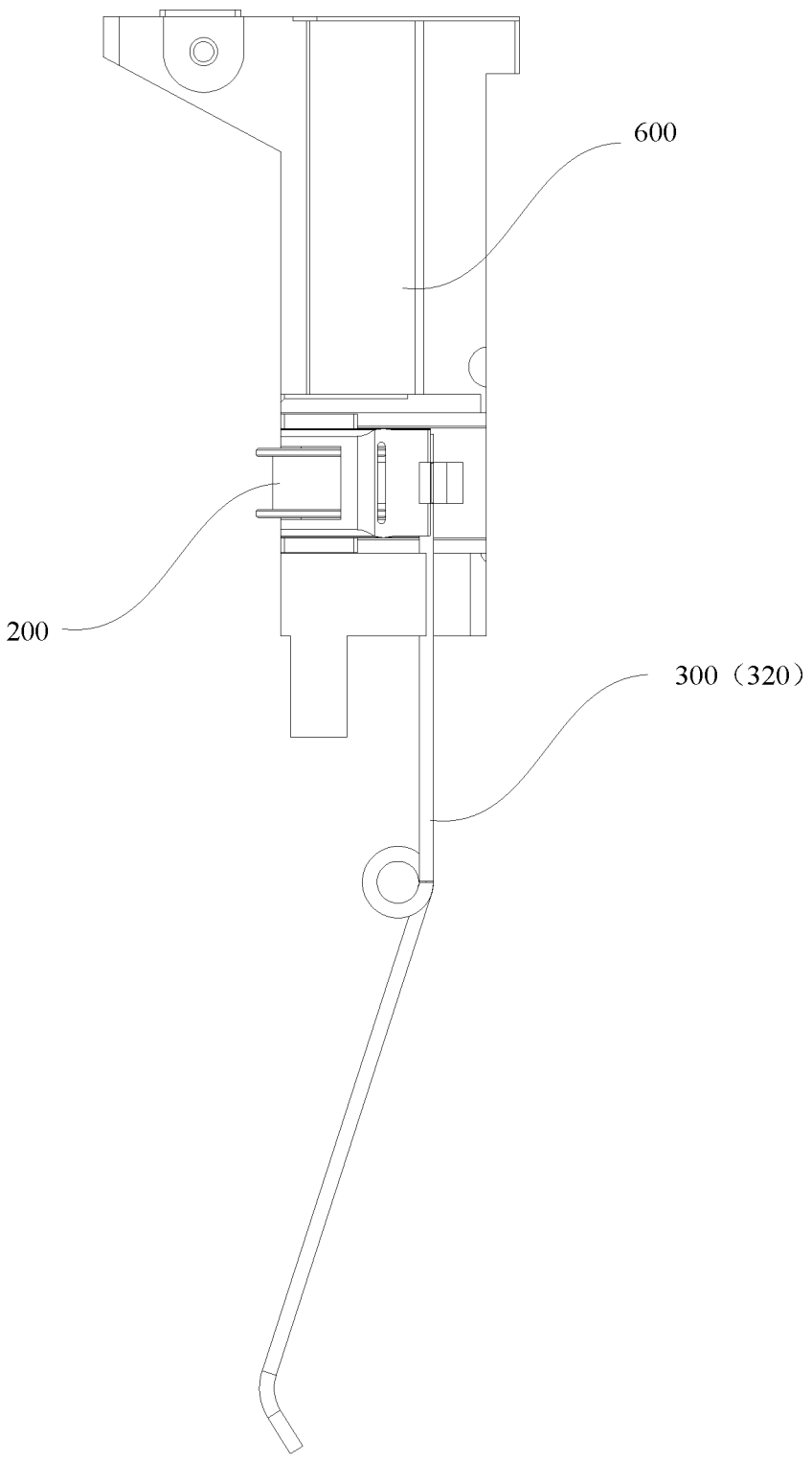
FIG. 14 is a schematic structural diagram of a part in FIG. 11.

FIG. 11 is a schematic structural diagram of a timing belt tensioner for a 3D printer according to some embodiments of the present disclosure. FIG. 12 is an exploded view of FIG. 11. FIG. 13 is a partial sectional view taken at a position of an idler in FIG. 11. FIG. 14 is a schematic structural diagram of a part in FIG. 11. It may be understood that, the embodiments shown in FIG. 11 to FIG. 14 are variations of the elastic member 300 on the basis of the embodiments described above, and other components not described in detail are the same as or similar to the embodiments described above.

In some embodiments, the elastic member 300 includes a torsion spring 320, the torsion spring 320 includes a body 321, and a first torsion arm 322 and a second torsion arm 323 connected to two ends of the body 321, the base 600 is provided with a mounting column 610, the body 321 is sleeved on the mounting column 610, the first torsion arm 322 abuts against the base 600, the mounting frame 100 is provided with a clamping groove 120, and the second torsion arm 323 is clamped in the clamping groove 120.

The body 321 may be of a spiral structure, a certain angle may be formed by the first torsion arm 322 and the second torsion arm 323, and the torsion spring 320 may be deformed by changing the angle, so as to provide an elastic force.

The mounting column 610 may be of a columnar structure, the base 600 may be provided with a clamping hook or a clamping hole, and an end of the first torsion arm 322 facing away from the body 321 may be clamped in the clamping hook or the clamping hole.

The mounting frame 100 may be provided with a clamping groove 120, that is, the clamping groove 120 may be a groove formed on the mounting frame 100. In addition, a stopping portion 121 may be disposed on the outer side of the clamping groove 120, and the stopping portion 121 may prevent the second torsion arm 323 from being disengaged from the clamping groove 120.

In some embodiments, the fastening assembly 400 may include one third fastener 440, and the base 600 may include a plurality of portions. The two parts designated by reference numeral 600 in FIG. 11 both can refer to the base and can be kept relatively fixed. The first torsion arm 322 may be connected to one portion, and the other portion may be provided with an elongated hole 140. The third fastener 440 may make the base 600 in threaded connection with the mounting frame 100 through the elongated hole 140.

It may be understood that, FIG. 5, FIG. 7, FIG. 9 and FIG. 10 are modifications of the configuration mode of the fastening assembly 400 based on the embodiment in which the elastic member 300 includes the coil spring 310. However, the configuration mode of the fastening assembly 400 in FIG. 5, FIG. 7, FIG. 9 and FIG. 10 may be used not only in the embodiment of the coil spring, but also in the embodiment of the torsion spring shown in FIG. 11, depending to the actual situation. Certainly, the configuration mode of the fastening assembly 400 in the embodiment shown in FIG. 11 can also be applied to the embodiment of the coil spring 310 described above.

In addition, the embodiments of the present disclosure also provide a 3D printer, the 3D printer including: a movement mechanism; a base 600 and a timing belt tensioner for a 3D printer, where the base 600 is provided with a timing belt 700 configured to drive the movement mechanism of the 3D printer to move on an XY plane, and the timing belt 700 is wound around the idler 200 of the timing belt tensioner.

The structure and function of the base 600 and the timing belt tensioner are the same as those of the above embodiments, and reference may be made to the above embodiments.

The 3D printer provided by the embodiments of the present disclosure is provided with a timing belt tensioner. The timing belt tensioner includes: a mounting frame, an idler and an elastic member, where the idler is connected to the mounting frame, and a timing belt of the 3D printer is wound around the idler, and is configured to drive a movement mechanism of the 3D printer to move on an XY plane; and the elastic member is configured to connect the mounting frame and a base of the 3D printer, and the mounting frame can slide to a balance position relative to the base under the action of an elastic force of the elastic member. When it is required to adjust a tensile force of the timing belt, the fastening assembly can be loosened, such that the mounting frame can drive the idler to slide to a balance position relative to the base under the action of the elastic force of the elastic member. When at the balance position, the force of the timing belt acting on the idler and the elastic force of the elastic member can be kept balanced, and the timing belt can be automatically tensioned to a predetermined range and is in a suitable tension state. Compared with manual adjustment on a tensile force of a timing belt, the present disclosure makes it easier to adjust the tensile force of the timing belt to a predetermined range with simpler operation.

In addition, the terms "first", "second" and "third" are only for the purpose of description, and may not be construed as indicating or implying the relative importance or implicitly indicating the number of technical features denoted. Thus, features defined by "first", "second" and "third" may explicitly or implicitly include one or more of the features. In the description of the present disclosure, "plurality" refers to two or more, unless otherwise explicitly and specifically defined.

In the present disclosure, unless otherwise clearly specified and defined, the terms "arrange", "link", "connect", "fasten" and the like should be comprehended in its broad sense. For example, "connect" may be "fixedly connect", "detachably connect" or "integrally connected as one"; "mechanically connect", "electrically connect" or "communicate"; "directly interconnect" or "indirectly interconnect through an intermediate"; or "the communication between the interiors of two elements" or "the interaction between two elements". For those of ordinary skill in the art, the specific meanings of the above terms in the present disclosure can be construed according to specific situations.

Unless otherwise explicitly stated or defined herein, the recitation of a first feature "on" or "under" a second feature may include the recitation of the first and second features being in direct contact, and may also include the recitation that the first and second features are not in direct contact, but are in contact via another feature between them. Moreover, a first feature "on", "above" and "over" a second feature includes a first feature being directly above and obliquely above a second feature, or simply indicating that a horizontal height of a first feature is higher than that of a second feature. A first feature "beneath", "under" and "below" a second feature includes a first feature being directly under and obliquely under a second feature, or simply indicating that a horizontal height of a first feature is smaller than that of a second feature.

The present specification provides a number of different embodiments or examples used to implement the present disclosure. It should be understood that, these different embodiments or examples are illustrative only. Therefore, the protection scope of the present application shall be subject to the protection scope defined by the appended claims.

Reference numerals:

| 100: mounting frame; | 110: annular protrusion; |
|---|---|
| 120: clamping groove; | 121: stopping portion; |
| 130: lug portion; | 140: elongated hole; |
| 150: bottom wall; | 160: top wall; |
| 170: side wall; | 171: first aperture; |
| 172: second aperture; | 200: idler; |
| 300: elastic member; | 310: coil spring; |
| 320: torsion spring; | 321: body; |
| 322: first torsion arm; | 323: second torsion arm; |
| 400: fastening assembly; | 410: first fastener; |
| 420: rotary block; | 430: second fastener; |
| 440: third fastener; | 500: pressing block; |
| 510: pressing portion; | 511: protrusion; |
| 520: first mounting hole; | 530: through hole; |
| 600: base; | 610: mounting column; |
| 700: timing belt; | 800: pulley; and |
| 900: connecting wheel. | |

The invention claimed is:

1. A timing belt tensioner for a three-dimensional (3D) printer, the timing belt tensioner comprising:
   a mounting frame;
   an idler pivotally connected to the mounting frame, wherein a timing belt of a 3D printer is wound around the idler and is configured to drive a movement mechanism of the 3D printer to move on a plane; and
   an elastic member configured to connect the mounting frame and a base of the 3D printer such that the mounting frame drives the idler to slide to a balance position relative to the base under an elastic force of the elastic member, wherein at the balance position, a balance is reached between the elastic force of the elastic member and a tensile force of the timing belt acting on the idler;
   a fastening assembly; and, wherein the mounting frame is fastened to the base through the fastening assembly and is at the balance position;
   wherein the fastening assembly comprises at least one third fastener, wherein the mounting frame is provided with at least one elongated hole extending in a direction parallel to a sliding direction of the mounting frame, and each third fastener of the at least one third fastener penetrates through a corresponding elongated hole of the at least one elongated hole and is in threaded connection with the base.

2. The timing belt tensioner according to claim 1, wherein the elastic member comprises a coil spring having a first end abutting against the mounting frame and a second end abutting against the base.

3. The timing belt tensioner according to claim 2, wherein the mounting frame is provided with an annular protrusion, and the first end of the coil spring is disposed at a position defined by the annular protrusion; or
   the mounting frame is provided with an annular recess, and the first end of the coil spring is disposed at a position defined by the annular recess.

4. The timing belt tensioner according to claim 1, wherein the elastic member comprises a torsion spring, the torsion spring comprising a body, and a first torsion arm and a second torsion arm connected to two ends of the body;
   the base is provided with a mounting column on which the body is sleeved, and the first torsion arm abuts against the base; and
   the mounting frame is provided with a clamping groove, and the second torsion arm is clamped in the clamping groove.

5. The timing belt tensioner according to claim 4, wherein a stopping portion is disposed on an outer side of the clamping groove and abuts against the second torsion arm.

6. The timing belt tensioner according to claim 1, further comprising: a pressing block having a pressing portion for contacting the mounting frame to press the mounting frame against the base; and, wherein the fastening assembly is configured to fasten the pressing block on the base.

7. The timing belt tensioner according to claim 6, wherein the pressing portion comprises two protrusions disposed on the pressing block, and the mounting frame is provided with two lug portions, and each protrusion of the two protrusions is configured to be pressed against one corresponding lug portion of the two lug portions.

8. The timing belt tensioner according to claim 7, wherein the base is provided with a mounting groove for accommodating the elastic member and the mounting frame, and the two lug portions of the mounting frame protrude from the mounting groove and are positioned between the two protrusions and a side wall of the base, respectively.

9. The timing belt tensioner according to claim 6, wherein the fastening assembly comprises a plurality of first fasteners, and the pressing block is provided with a plurality of first mounting holes, wherein each first fastener of the plurality of first fasteners penetrates through a corresponding first mounting hole of the plurality of first mounting holes and is in threaded connection with the base.

10. The timing belt tensioner according to claim 6, wherein the pressing block is provided with a second mounting hole, and the fastening assembly comprises:
    a rotary block rotatably connected to the base, wherein the pressing block is provided with a through hole matched with the rotary block in shape, and when the rotary block rotates to a preset angle relative to the through hole, the rotary block is capable of penetrating through the through hole; and
    a second fastener, wherein the second fastener penetrates through the second mounting hole and is in threaded connection with the base.

11. The timing belt tensioner according to claim 1, wherein the base is provided with at least one elongated hole extending in a direction parallel to a sliding direction of the mounting frame, and each third fastener of the at least one third fastener penetrates through a corresponding elongated hole of the at least one elongated hole and is in threaded connection with the mounting frame.

12. The timing belt tensioner according to claim 11, wherein the at least one third fastener comprises two third fasteners located on two ends of the mounting frame, respectively, and the two ends of the mounting frame are opposite to each other in a direction perpendicular to the sliding direction of the mounting frame relative to the base.

13. The timing belt tensioner according to claim 1, wherein the mounting frame is provided with a bottom wall, a top wall and a side wall connecting the bottom wall and the top wall; and, wherein idler is pivotally connected between the bottom wall and the top wall, the side wall is provided with a first aperture and a second aperture for the timing belt to penetrate in and out, respectively, and the elastic member is connected to the side wall.

14. A 3D printer, comprising:

a movement mechanism; the movement mechanism includes at least one of a printing head for ejecting a printing material, a print table for accommodating the printing material;

a base provided with a timing belt configured to drive the movement mechanism to move on a plane; and a timing belt tensioner, wherein the timing belt is wound around an idler of the timing belt tensioner, the timing belt tensioner comprises:

a mounting frame;

an idler pivotally connected to the mounting frame, wherein a timing belt of a 3D printer is wound around the idler and is configured to drive a movement mechanism of the 3D printer to move on the plane; and an elastic member configured to connect the mounting frame and a base of the 3D printer such that the mounting frame drives the idler to slide to a balance position relative to the base under an elastic force of the elastic member, wherein at the balance position, a balance is reached between the elastic force of the elastic member and a tensile force of the timing belt acting on the idler;

a fastening assembly; and, wherein the mounting frame is fastened to the base through the fastening assembly and is at the balance position;

wherein the fastening assembly comprises at least one third fastener, wherein the mounting frame is provided with at least one elongated hole extending in a direction parallel to a sliding direction of the mounting frame, and each third fastener of the at least one third fastener penetrates through a corresponding elongated hole of the at least one elongated hole and is in threaded connection with the base.

15. The 3D printer according to claim 14, wherein the at least one third fastener comprises two third fasteners located on two ends of the mounting frame, respectively, and the two ends of the mounting frame are opposite to each other in a direction perpendicular to the sliding direction of the mounting frame relative to the base.

16. The 3D printer according to claim 14, wherein the base is provided with at least one elongated hole extending in a direction parallel to a sliding direction of the mounting frame, and each third fastener of the at least one third fastener penetrates through a corresponding elongated hole of the at least one elongated hole and is in threaded connection with the mounting frame.

* * * * *